(12) United States Patent
Pelletier et al.

(10) Patent No.: US 8,532,009 B2
(45) Date of Patent: *Sep. 10, 2013

(54) METHOD AND A DEVICE FOR SAVING POWER IN A WIRELESS USER TERMINAL

(75) Inventors: Ghyslain Pelletier, Boden (SE); Jonas Pettersson, Luleå (SE); Kristofer Sandlund, Luleå (SE); Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,508

(22) Filed: Mar. 26, 2012

(65) Prior Publication Data

US 2012/0182916 A1   Jul. 19, 2012

Related U.S. Application Data

(63) Continuation of application No. 12/597,216, filed as application No. PCT/SE2007/050821 on Nov. 7, 2007, now Pat. No. 8,169,943.

(30) Foreign Application Priority Data

Apr. 27, 2007 (SE) ...................................... 0701031

(51) Int. Cl.
 *G08C 17/00* (2006.01)
(52) U.S. Cl.
 USPC ......................................................... 370/311
(58) Field of Classification Search
 None
 See application file for complete search history.

(56) References Cited

U.S. PATENT DOCUMENTS

| 8,169,943 | B2 * | 5/2012 | Pelletier et al. | 370/311 |
|---|---|---|---|---|
| 2004/0100940 | A1 * | 5/2004 | Kuure et al. | 370/349 |
| 2005/0032555 | A1 * | 2/2005 | Jami et al. | 455/574 |
| 2007/0259673 | A1 * | 11/2007 | Willars et al. | 455/453 |
| 2007/0286080 | A1 * | 12/2007 | Kim et al. | 370/236 |
| 2008/0090573 | A1 * | 4/2008 | Kim et al. | 455/436 |

(Continued)

FOREIGN PATENT DOCUMENTS

| EP | 1511337 A1 | 3/2005 |
|---|---|---|
| JP | 2008517515 A | 5/2008 |
| WO | 2006040769 A1 | 4/2006 |
| WO | 2007024095 A2 | 3/2007 |

OTHER PUBLICATIONS

Nokia, "On the Need for Flexible DRX", 3GPP TSG-RAN WG2 Meeting #57bis, R2-071286, Mar. 26, 2007, 3GPP, St. Julian's, Malta.

(Continued)

*Primary Examiner* — Anh-Vu Ly
(74) *Attorney, Agent, or Firm* — Coats & Bennett, P.L.L.C.

(57) ABSTRACT

A method for use in a cellular system with at least one controlling node, eNodeB, which controls user terminals, UEs, in a cell. According to the method, a UE can be in one of at least two different states, an idle state, a DRX state, and an "on duration" state. A UE can receive at least a first and a second type of traffic from its eNodeB. If the first type of traffic is received by a UE during an on duration period, the UE assumes the idle (DRX) state at the end of the on duration period, and if the second type of traffic is received by the UE during an on duration period, the UE prolongs the current on duration period by a certain amount of time.

18 Claims, 5 Drawing Sheets

(56) References Cited

U.S. PATENT DOCUMENTS

| | | |
|---|---|---|
| 2009/0034452 A1* | 2/2009 | Somasundaram et al. .... 370/328 |
| 2010/0309798 A1* | 12/2010 | Fodor et al. .................. 370/252 |
| 2010/0311411 A1* | 12/2010 | Lindbom et al. ............. 455/424 |

OTHER PUBLICATIONS

3rd Generation Partnership Project, "Summary of Email Discussion on DRX Control", Email rapporteur (NEC), RAN2 #57bis, R2-071553, Mar. 26, 2007, 3GPP, St. Julian's, Malta.

Nokia, "DRX Parameters in LTE", 3GPP TSG-RAN WG2 Meeting #57bis, R2-071285, Mar. 26, 2007, 3rd Generation Partnership Project, St. Julian's, Malta.

Ericsson, "Issues on DRX in LTE Active", 3GPP TSG-RAN WG2 Meeting #57, R2-070797, Feb. 12, 2007, 3GPP, St. Louis, Missouri, USA.

Research in Motion Limited, "Criteria for DRX Value Update", 3GPP TSG RAN WG2 Meeting #57, R2-070895, 200-02-12, 3GPP, St. Louis, Missouri, USA.

Ericsson, "High Level Principles for DRX in LTE Active", 3GPP TSG-RAN WG2 Meeting #57bis, R2-071365, Mar. 26, 2007, 3GPP, St. Julian's, Malta.

Ericsson, "A Semi-Autonomous DRX Control Scheme for LTE_ACTIVE", 3GPP TSG-RAN WG2 Meeting #57-bis, R2-071393, Mar. 26, 2007, 3GPP, Malta.

NTT Docomo, Inc., "Views on DRX/DTX control in LTE", 3GPP TSG RAN WG2 #56, R2-063397, Nov. 6, 2006, 3GPP, Riga, Latvia.

Panasonic, "DRX and DTX Operation in LTE_Active", 3GPP TSG-RAN WG2 Meeting #52, R2-060888, Mar. 27, 2006, 3GPP, Athena, Greece.

* cited by examiner

METHOD AND A DEVICE FOR SAVING POWER IN A WIRELESS USER TERMINAL

RELATED APPLICATIONS

This application is a continuation of U.S. patent application Ser. No. 12/597,216, filed Oct. 23, 2009, which is a national stage application of PCT/SE2007/050821, filed Nov. 7, 2007, which claims priority to Swedish Patent Application No. 0701031-7, filed Apr. 27, 2007.

TECHNICAL FIELD

The present invention discloses a method and a device for saving power in a wireless user terminal in a cellular wireless access system of the 3G kind.

BACKGROUND

In the 3GPP project for cellular wireless systems, a mechanism which has as one of its purposes save battery time in user terminals will be introduced, the mechanism being referred to as Discontinuous Reception or DRX.

By means of the DRX mechanism, a user terminal will be able to turn on and off radio resources for a certain amount of time, based on configured parameters and specified rules.

As an example of a DRX mechanism, mention might be made of the so called Continuous Packet Connectivity mechanism, CPC, for WCDMA systems, in which a DRX scheme is specified. According to this scheme, a user terminal initiates continuous usage of its radio resources (continuous reception) as soon as it receives data during a non-DRX period, and resumes a DRX state based on a "timeout" following a period in time during which no data is received.

In 3G systems, as in many other wireless cellular systems, there is a controlling node, in 3G referred to as eNodeB, which has as one of its purposes to control traffic to and from user terminals within a certain area, a cell, in the system. In order for a DRX mechanism to function properly, a set of clear rules are needed to enable the eNodeBs of the system to determine, at all times, the state of "their" user terminals with respect to DRX, i.e. DRX or not.

In LTE systems, there can mainly be two kinds of traffic, real time traffic and non real-time traffic, the latter usually being so called best effort traffic.

For cases of mixed traffic, i.e. cases in which both non real-time (for example "best effort") flows and real-time flows may be active concurrently, it may with present solutions be difficult for user terminals to have DRX periods, and also to give such periods a suitable duration, a problem which in part is caused by a current approach which is to let a user terminal assume the DRX state based on the characteristics of the traffic.

The approach of deriving a DRX period based on the traffic characteristics or pattern may be suited for non real-time traffic, but it is unclear how well it can be applied to real-time traffic such as VoIP, or to the combination of both, i.e. for mixed traffic. This is particularly relevant as DRX schemes are per UE, and not per Radio Access Bearer, RAB, or per Radio Bearer, RB.

In summary, it can be said that with existing solutions to DRX periods in mixed traffic systems, a problem is that those solutions do not take into account the characteristics of the services in the mixed scenario. In other words, current solutions may not work well when traffic with varying characteristics (real time/non real time) will be active concurrently for one and the same UE.

One possible approach might be to use a scheme that satisfies the real-time traffic delay requirements, which are more stringent than for the non real-time traffic. The eNodeB could, in such a scheme, signal explicitly to the UE e.g. using MAC indications, to change the DRX state or "to be awake" for some "on-duration" period until both the real-time and the non real-time data have been is received, following which the UE could resume DRX by means of an explicit signalling, or autonomously.

However, the purpose of the periodic DRX pattern is quite different between real-time services and best effort services; for the former, it is meant to match the generation of application data (e.g. encoded speech generated at a 20 ms boundary), while for the latter it is meant to provide an upper boundary for the additional delay that best effort data may incur due to DRX.

This means that using only the real-time DRX scheme for mixed traffic could either interfere with how well the periodic wake up of the UE would match the application sending rate, or it might bring about short DRX periods most of the time, even if very little non real-time data is sent. It could also contribute to increased jitter for the real-time flow, which is obviously not a desirable characteristic.

SUMMARY

Thus, as has been indicated above, there is a need for a solution to the problem of DRX periods in wireless cellular access systems of the LTE kind, in which there can be two kinds of data, for example real time and non-real time data. The solution should offer an eNodeB the possibility of always knowing which state "its" user terminals are in, DRX or non DRX, as well as accommodating the needs for DRX posed by different kinds of traffic.

The solution should also be possible to apply in other kinds of systems than LTE systems, in which there are periods similar to the DRX periods, i.e. periods during which a UE does not listen for data from its controlling node.

Such a solution is offered by the present invention in that it discloses a method for use in a cellular wireless access system, in which system there can be at least one controlling node, which serves to, inter alia, control the transmissions to and from user terminals, UEs, in a certain area, a cell, of the system.

According to the method of the invention, a UE can be in one of at least two different states, a first such state being a state in which the UE does not listen for data from its controlling node, and a second such state being a listening state, an "on duration" state, each state being assumed for a certain amount of time.

In a system in which the invention can be applied, a UE can receive at least a first and a second type of data from its controlling node, and according to the method of the invention, if the first type of data is received by a UE during an on duration period, the UE assumes the first (non listening) state at the end of the on duration period, and if the second type of data is received by the UE during an on duration period, the UE prolongs the current on duration period by a certain amount of time.

The term "data" is here used in a broad sense, and thus encompasses, for example, so called Layer 1 and Layer 2 (e.g. control plane) signalling, such as scheduling assignments, grants, as well as user-plane data, etc.

Suitably but not necessarily, the first type of data can be real time data or signalling related to the transmission of real time data, such as, for example, scheduling grants or a scheduling assignments for the purpose of allocating resources for real time data.

Also, suitably but not necessarily, the second type of data can be non-real time data, so called Best Effort data, or signalling related to the transmission of Best Effort Data, such as, for example, scheduling grants, scheduling assignments and other types of Layer 1/Layer 2 signalling.

Thus, the invention discloses a method by means of which the demands for DRX-like states by two types of data, such as real time and non-real time data can be accommodated.

In a particular embodiment of the invention, there is comprised an "inactivity timer" which is specified as an amount of time, and if Best Effort data is received by an UE during an ongoing on duration period, the UE prolongs the on duration state for the period of time which corresponds to the inactivity timer. Thus, the controlling node will know the amount of time that DRX-like state will be extended by in the UE following transmission of Best Effort data by the controlling node to the UE.

In another embodiment of the invention, a UE can also receive control information from its controlling node, which explicitly orders the UE to assume one of the two states, non listening/on duration at the end of the current on duration period, said order also comprising the amount of time that the state should be assumed for. This is thus another way for the controlling node to know which state the UE will be in, and for how long the UE will assume that state.

The control messages can suitably be so called MAC signalling, by means of which the controlling node can thus order the UE to assume one of the two states for a certain amount of time.

These and other advantages of the invention will become even more evident from the detailed description of the invention given below.

BRIEF DESCRIPTION OF THE DRAWINGS

The invention will be described in more detail in the following, with reference to the appended drawings, in which.

DETAILED DESCRIPTION

Figure 1:
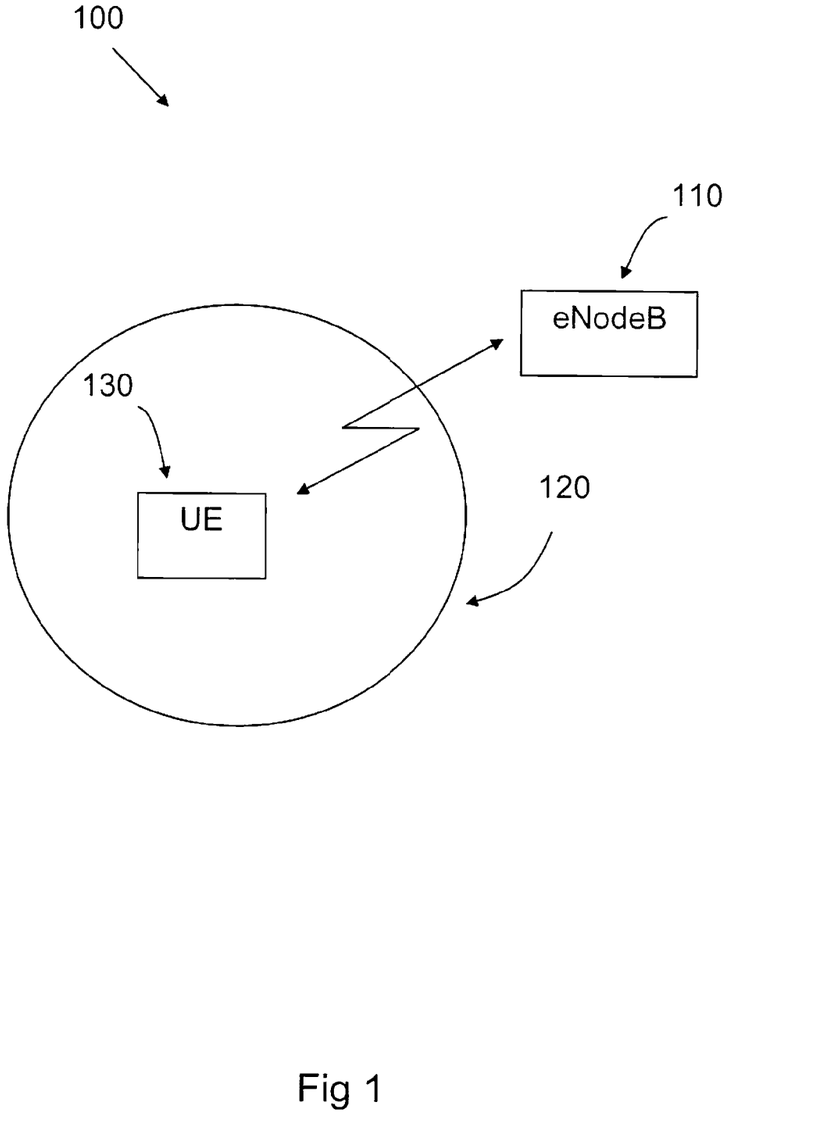
FIG. 1 shows an overview of a system in which the invention can be applied.

FIG. 1 shows a rough overview of a system in which the invention can be applied. As has been mentioned previously, the system for which the invention is intended is a wireless cellular access system of the LTE kind (Long Term Evolution). Such a system will, as shown in FIG. 1, comprise a controlling node 110, which has as one of its roles to control all the traffic to and from user terminals, UEs, within a certain area, a so called cell within the system. On such cell is shown symbolically as 120 in FIG. 1, with one UE 130 within the cell.

Naturally, the number of cells in a system in which the invention is applied, and the number of UEs which can be used within such a cell can be varied greatly, the number of cells and UEs shown in FIG. 1 is merely an example intended to facilitate the reader's understanding of the present invention.

In addition, the type of system in which the invention is applied need not be an LTE type of system, the invention can be applied in other types of wireless cellular access systems as well. Thus, the use of terminology in this description of terms borrowed from LTE type systems should merely be seen as examples intended to facilitate the reader's understanding of the present invention.

As also explained previously, the invention mainly deals with the problems posed by mechanisms involving periods of discontinuous reception, in LTE referred to as so called DRX periods. Before the invention is described in more detail, some basic definitions used in this text will first be explained, with reference to FIG. 2.

Figure 2:
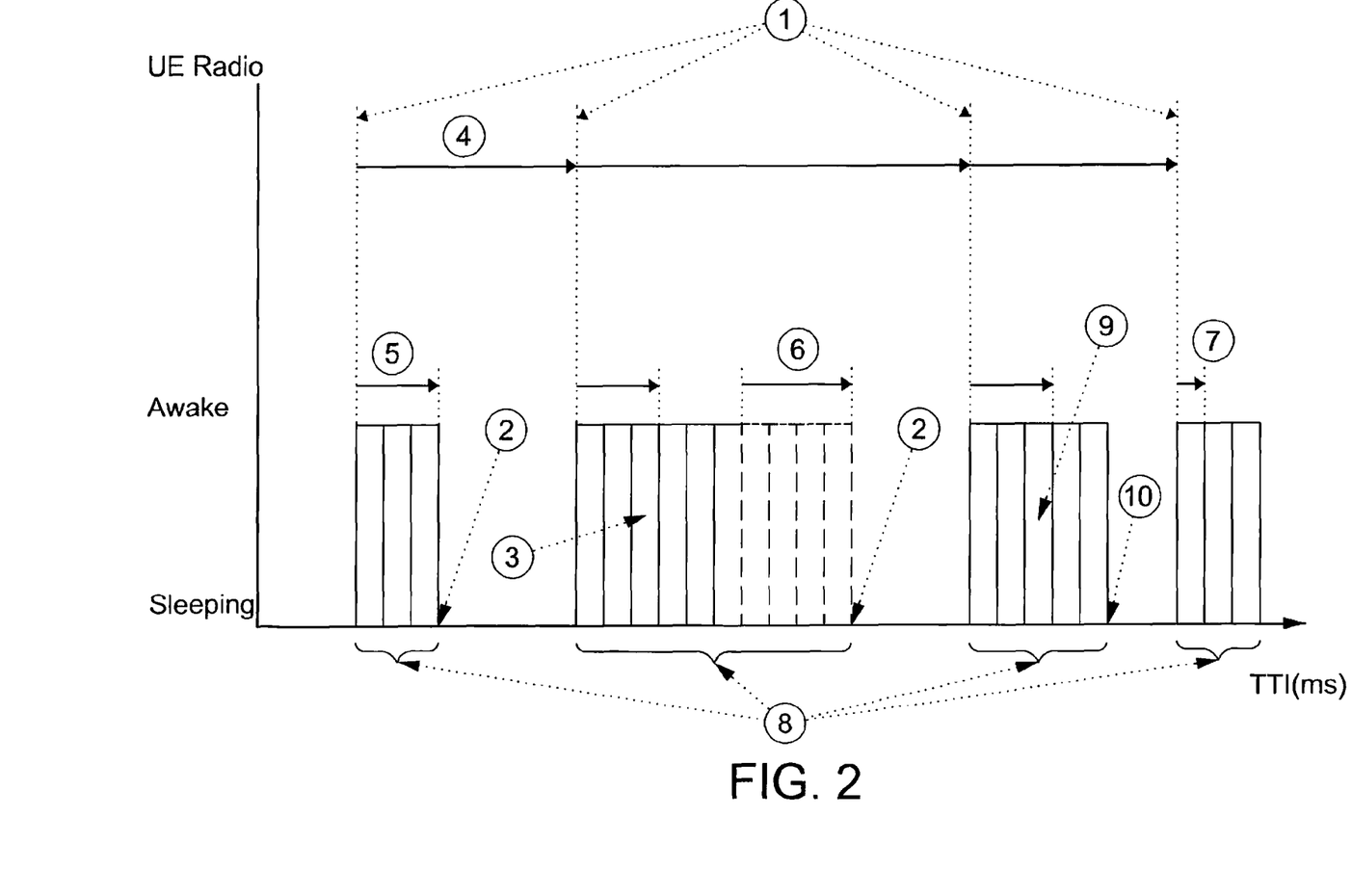
FIG. 2 shows some definitions used in this text.

FIG. 2 shows the UE radio state as a function of time, the time being shown in TTIs, Transmission Time Intervals. The numerals used in FIG. 2 correspond to the following definitions or events:

1. Wake up points, points in time at which a UE wakes up, or in other words goes from a DRX state to a listening state.

2. Implicit go to sleep order: if the UE during the on duration period does not receive any data which triggers a new on-duration period, it assumes the DRX state.

3. Implicit Stay awake order: if the UE receives any Best Effort data during an on duration period it extends the current on duration period by a certain pre-determined amount of time, suitably the length of one more on duration period.

4. DRX intervals, intervals with which a certain DRX pattern is repeated.

5. On-duration period: a period in time during which the UE waits for the reception of data, after waking up from DRX.

6. Inactivity timer: a duration in time that the UE waits to successfully receive data (decode PDCCH) from the last reception of data (decoding of PDCCH), failing which the UE re-enters the DRX state, i.e. the non-listening state. The UE restarts the activity timer following a single reception of data (decoding of a PDCCH).

7. One TTI, Transmission Time Interval. The period shown as "7" could however also be another interval in time, e.g. a so called sub-frame, of which there may be one or more per TTI.

8. "Awake" time for the UE.

9. Explicit stay awake: an eNodeB may send an explicit order to a UE to stay awake, usually by means of so called MAC or RRC (Radio Resource Control) signalling.

10. Explicit go to sleep: an eNodeB may send an explicit order to a UE to go to sleep, usually by means of so called MAC or RRC (Radio Resource Control) signalling.

In addition to the periods and events shown in FIG. 2, there also exists the notion of a "DRX period", i.e. a period during which the UE assumes an idle state, i.e. it does not listen for data during this period. This period may be variable, and normally equals the DRX interval minus the awake time during one and the same DRX interval.

Regarding the term idle, it could be pointed out that in this text, the term "idle" refers to a non-listening state of a UE, i.e. the radio resources in the UE which can be used for reception of transmissions from the eNodeB are turned off.

Returning now to the present invention, a basic concept of the invention is to use a DRX scheme for mixed traffic (real time data and Best Effort data) which uses a common DRX period, at which the end of which the UE wakes up and listens for data, usually on the L1/L2 control channel.

One way of achieving an autonomous (controlled by the UE or the eNodeB) transition between DRX periods and "listening" periods, as well as the lengths of those periods is to let the lengths of these periods be implicitly derived by knowledge of whether data received by the UE is best-effort data or real-time data. This will be described in more detail in the following.

Another basic idea behind the present invention is to use one and the same DRX mechanism regardless of the type of traffic, i.e. to use one and the same DRX mechanism in the presence of mixed traffic, while letting eNodeBs use "wake-up" opportunities to schedule non real-time data, where applicable.

Thus, in one embodiment of the invention, when non real-time data is sent by the eNodeB to the UE, the UE stays awake for an additional pre-configured "awake time", and assumes the DRX state either implicitly, e.g. using an inactivity timer, or explicitly by means of signalling from the eNodeB, e.g. MAC signalling. Real-time traffic can be sent by the eNodeB during the "on duration" periods, and the sending of best-effort data will not conflict with the periodicity of the DRX interval, and by whether or not it matches the expected real-time traffic pattern.

These basic concepts of the invention will now be explained in more detail with reference to FIG. 3, which is based on the concepts used and explained in FIG. 2.

A first on-duration period has a duration of three TTIs. In the first TTI of this period, real time data is received by the UE, and in the third and final TTI, RTCP data (see below) is received, following which the UE can assume the DRX state, i.e. the UE "goes to sleep".

The term "RTCP data" which was used above stands for Real-time Transport Control Protocol, and is the control part of RTP, which provides control information such as sender and receiver reports (losses, delays etc). Normally, when, for example, VoIP is active, RTCP data is also sent, corresponding to no more than 5% of the total bandwidth consumed by the VoIP flow. The UE can assume the DRX state directly after this, since RTCP can be considered part of the real-time flow, i.e. it is sent on the same bearer as the VoIP flow, or is associated to the VoIP flow by some other means.

This is shown by the arrows with the numeral 2, which implies "implicit go to sleep", as explained above in conjunction with FIG. 2.

During the following DRX interval, real time data is received in TTI number two of the on duration period, and in the third and final TTI of the on duration period, best effort data is received, which, according to the method of the invention, causes the UE to prolong the ongoing on duration period by a predetermined amount of TTIs, usually and suitably the same amount of TTIs as is comprised in an ordinary on duration period, i.e. in the present example three TTIs. Thus, an extra on-duration period is added at the end of the ongoing on-duration period if best effort data is received during the on duration period.

Figure 3:
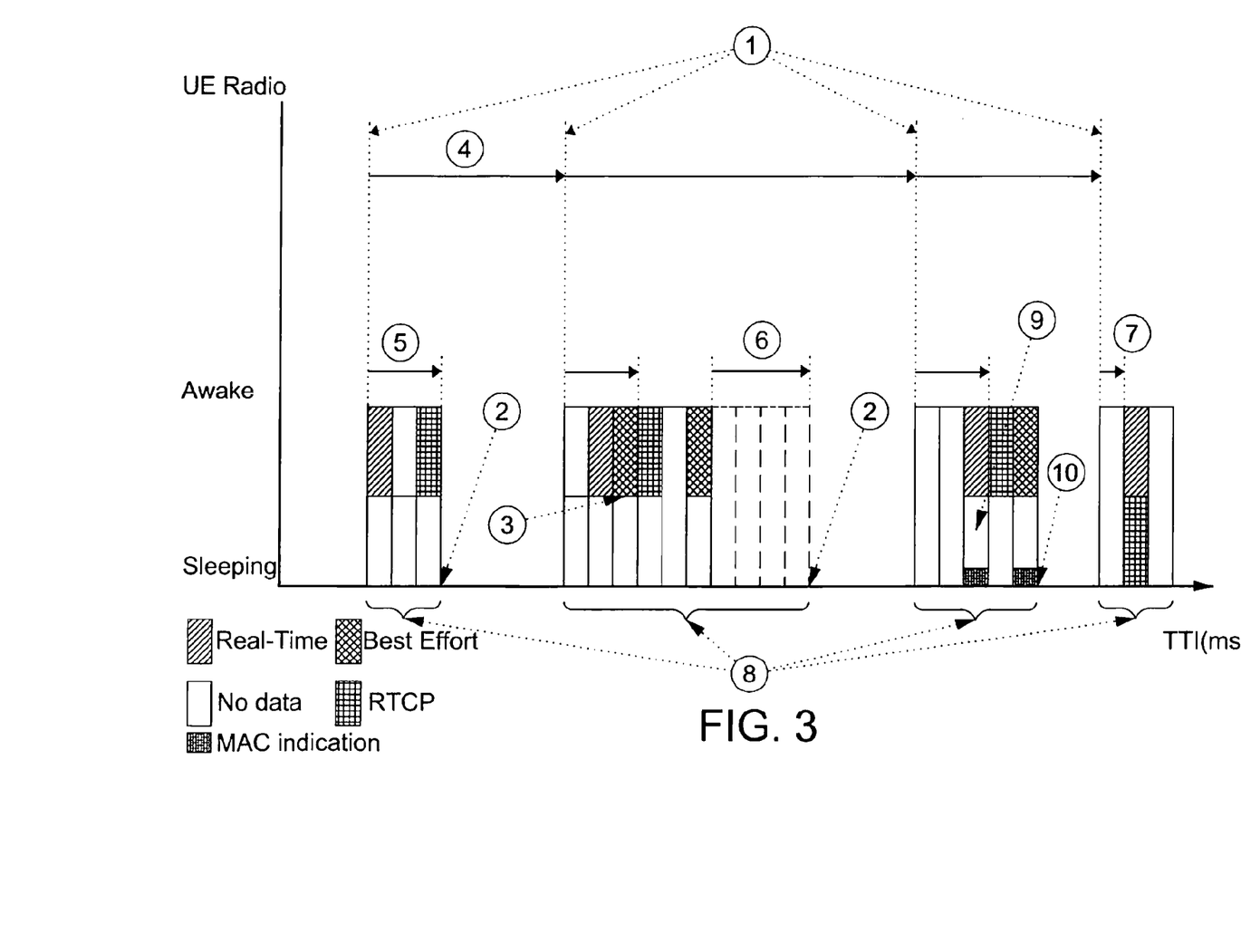
FIG. 3 shows a time graph according to the invention.

As an example, and as shown in FIG. 3, during the added on-duration period, best effort data is again received in the third and final TTI of the added on duration period. As can be expected, this again triggers the inactivity timer, in other words the UE adds a new on duration period at the end of the present on duration.

During the second added on duration period, as shown in FIG. 3, no data of any kind is received, so the UE assumes the DRX state at the end of the on duration period, i.e. "implicit go to sleep".

During the third DRX interval shown in FIG. 3, the UE receives real time data in the third TTI of the ordinary on duration period, which would mean that the DRX assumes the DRX state at the end of the on duration period. However, in the same TTI, the UE receives an explicit command from the eNodeB to "stay awake", i.e. to extend the present on duration period. This command can be sent in a number of ways, but in a preferred embodiment it is sent via so called MAC signalling. The MAC command "stay awake" can be expressed in a number of ways, e.g. "stay awake for X more TTIs at the end of the on duration period", or "stay awake until further commands are received".

During "the extended period", as shown in FIG. 3, the UE receives best effort data in TTI number two, which would normally have sent the UE into an extended "stay awake" period, i.e. an additional on duration period. However, in the same TTI, the UE receives an explicit command from the eNodeB to go to sleep, as shown by the arrow with the numeral "9", i.e. a command to assume the DRX state.

The explicit command to enter the DRX state can also be sent from the eNodeB to the UE in a number of ways, but in a preferred embodiment, it is sent via MAC signalling. The command can also be expressed in a number of different ways, e.g. "enter DRX immediately after this TTI", or "enter DRX after one more on duration period." The command shown in FIG. 3 is "enter DRX immediately after this TTI". In another preferred embodiment, the explicit command to enter the DRX state can be sent from the eNodeB to the UE with RRC signalling (Radio Resource Control).

Thus, FIG. 2 shows some of the concepts used in this text and by the invention, and FIG. 3, together with the description of that figure given above, shows some of the basic principles used in the invention. In the following, two particular embodiments of the invention will be described.

First Embodiment

The following describes one detailed embodiment of the invention: the DRX scheme is configured in the UE, by means of, for example, RRC (Radio Resource Control) Signalling, using only one kind of DRX Interval, the length of which is preferably adjusted to the maximum delay requirement of the most stringent real-time service anticipated in the system. This DRX interval with its length is maintained until it is reconfigured or deactivated.

In this first embodiment, the UEs wake up and listen for transmissions for a time equal to one "on duration" period at a specified point in time during the DRX intervals, suitably at the beginning of the intervals, as shown in FIG. 3.

In a system such as the LTE, there can be downlink traffic, DL, from the eNodeB to the UEs, and uplink traffic, UL, to the eNodeBs from the UEs. In this first embodiment, the following can be applied to downlink traffic:

For any TTI when the UE is awake, the awake-time (i.e. non-DRX) can be prolonged in one of two ways:
  implicitly, from the reception of non real-time data, which prolongs the "awake time" until the "Inactivity Timer" expires, or until an explicit "go to sleep" message is received, e.g. by means of MAC signalling;
  explicitly, from the reception of (e.g. MAC) signalling, which prolongs the "awake time" until the "Inactivity Timer" expires or until an explicit "go to sleep" (e.g. MAC) indication (whichever comes first);

The UE logic when data is received during an on duration period may be the following:
  The UE extends its listening period beyond the "DRX Duration" period if there is more data. After the "Inactivity Timer" (implicit) or from MAC "go to sleep" signalling (explicit), whichever comes first, the UE can go back to sleep.

The UE detects if there is more data based on:

MAC signalling (explicit) from the eNodeB;

Detection of non real-time data in at least one TTI in the configured on duration period, based e.g. on the identity of the MAC/RLC connection indicating a non real-time entity.

Otherwise, if there is no more data (which would have been detected, as indicated above), the UE can immediately assume the DRX state.

It can be noted that the same DRX scheme can be used for real-time traffic, where best-effort data would never be detected (not sent) and the eNodeB would not signal using MAC an "on-duration" period for best-effort data.

For uplink transmission, a similar scheme can be applied. After the UE has transmitted a data unit to the eNodeB, it may continue by transmitting further data using the used by the eNodeB for downlink transmission, as described above.

The term "waking up" as used above includes cases when semi-persistent scheduling and/or blind detection is used, i.e. when a UE instead of waking up only for one specific TTI would listen for data for a small interval instead.

The term "semi-persistent scheduling" refers to cases where the eNodeB has allocated a fixed Modulation and Coding Scheme, MCS, to a specific TTI/subframe (i.e. time/frequency), periodically recurring. The term "blind detection" refers to cases in which a radio receiver, such as a UE, knows at what time (TTI) there is a possibility that a transmission will be made, but does not know in what sub-band (i.e. frequency) and with what Modulation and Coding Scheme (MCS) the data might be transmitted. The term MCS is related to the type of modulation that is used for the transmission, as well as the code rate and the number of bits used.

Thus, in cases of "semi-persistent scheduling" or "blind detection", the receiver, the UE, must listen for a certain number of TTIs centred around the time when the transmission might be made, since there is no explicit signalling of the exact radio resources that would be used. In such cases, the UE will attempt to decode received data using different MCS, until it either has tried all possibilities unsuccessfully, or until it verifies at least one attempt successfully. Multiple TTIs (or rather sub-frames) around the expected TTI must be listened to, since the number of subframe used for the transmission depends on the MCS used.

It can also be pointed out that the logic described above for both the uplink and the downlink cases can be applied to any period of time during which a UE is awake (i.e. "on duration" periods).

The second particular embodiment of the invention will be described in the following.

Second Embodiment

One possible future feature in systems according to 3GPP is that a timer mechanism will be specified as part of the DRX solution to handle the issue of when a UE should return to the DRX state after receiving data. In other words, if a UE receives data during an on duration period, with such a feature it would wait a specified time after the data reception until it "goes to sleep", i.e. assumes the DRX state (unless an explicit go-to-sleep command has been received through MAC or RRC).

The second embodiment is intended mainly for a case in which one single such timer value is specified for the UE, said timer being valid for all bearers, regardless of which service that is mapped on the bearer. The second embodiment suggests a function for overriding the single timer value for bearers on which certain specified services (e.g. VoIP) are mapped.

The second embodiment thus involves:

Disabling the go-to-sleep ("return to DRX") timer for certain bearers, such as bearers configured for real-time traffic, e.g. bearers configured for Radio Link Control unacknowledged Mode, RLC-UM, Enter DRX ("go to sleep") according to the rules described in the first embodiment above for those bearers for which the timer has been disabled.

In other words, the second embodiment comprises a function according to which, if data is received on, for example, a "VoIP bearer", the UE goes to sleep as soon as possible, but if data is received on a "Best Effort", the UE waits the period of time specified by the single go-to-sleep timer before going to sleep.

Figure 4:
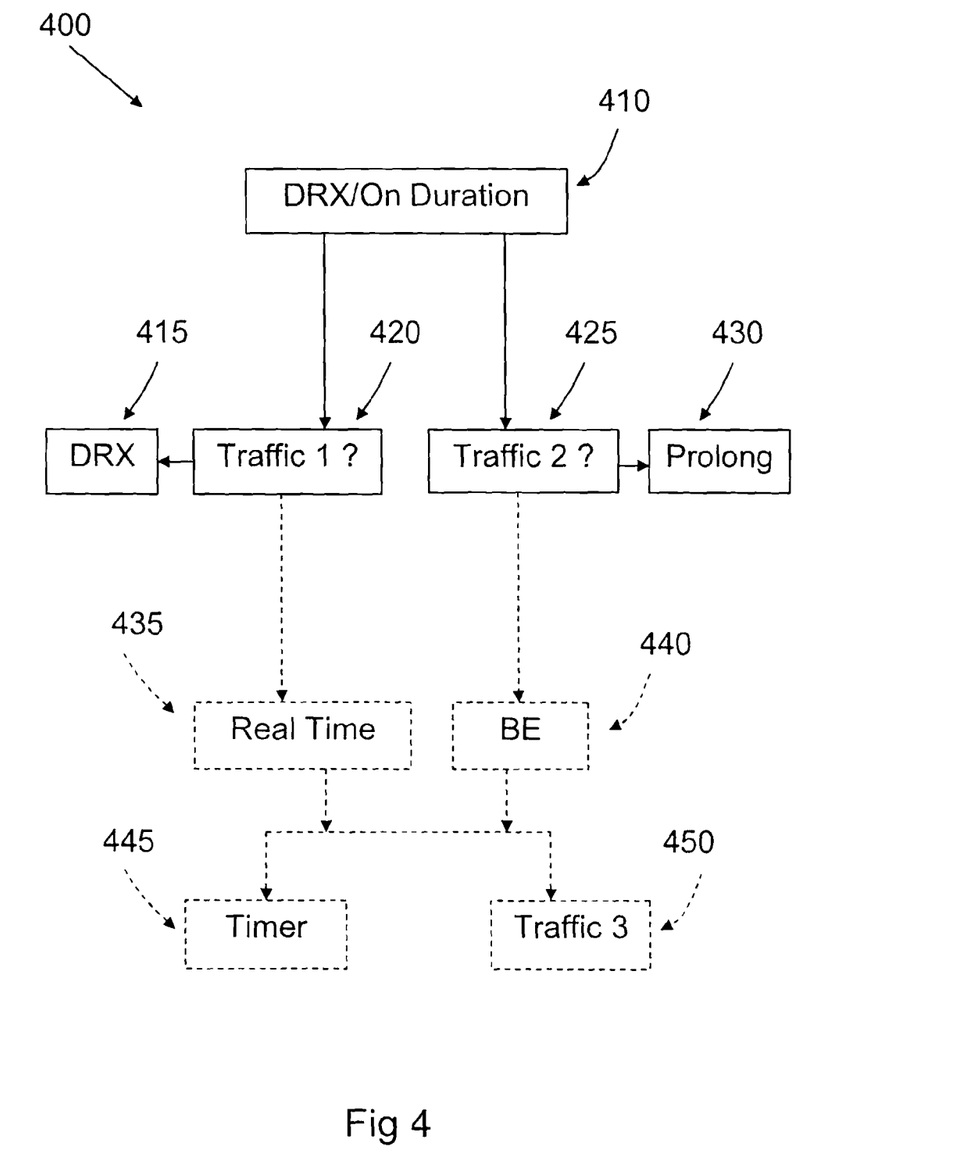
FIG. 4 shows a flow chart of a method of the invention.

FIG. 4 shows a rough flow chart of a method 400 of the invention. Steps which are options or alternatives are shown with dashed lines in FIG. 4. Thus, the method 400 of the invention, may, as explained previously, be used in a cellular wireless access system such as the system 100 of FIG. 1, in which system there can be at least one controlling node such as the node 110 in FIG. 1, which serves to, inter alia, control the transmissions to and from user terminals, UEs 130, in a certain area, a cell 120, of the system.

According to the method of the invention, as shown in step 410, a UE can be in one of at least two different states, a first such state being a state in which the UE does not listen for data from its controlling node, and a second such state being a listening state, an "on duration" state, each state being assumed for a certain amount of time.

As shown in steps 420 and 425, a UE in the system can receive at least a first (step 420) and a second (step 425) type of data from its controlling node, and as indicated in step 415, if the first type of data is received by a UE during an on duration period, the UE assumes the first state at the end of the on duration period, and if the second type of data is received by the UE during an on duration period, the UE prolongs the current on duration period by a certain amount of time.

As shown in step 435, the first type of data can be real time data, or signalling related to the transmission of real time data, and as shown in step 440, the second type of data is non-real time data, so called Best Effort data, or signalling related to the transmission of Best Effort Data.

Step 445 shows that the method may comprise an inactivity timer specified as an amount of time, and if Best Effort data is received by an UE during an ongoing on duration period, the UE prolongs the on duration state for the period of time which corresponds to the inactivity timer.

As shown in step 450, the UE can also receive control information from its controlling node, said control information explicitly ordering the UE to assume one of said two states (non listening/on duration) at the end of the current on duration period, said order also comprising the amount of time that the state should be assumed for. In one embodiment of the invention, the control information is within the so called MAC header, or Layer 2 RRC signalling.

Also, a MAC header can comprise an order to the UE to assume the non listening state for a certain amount of time following the current on duration period, or a MAC header can comprise an order to the UE to assume the on duration state for a certain amount of time following the current on duration period.

Suitably, the method of the invention may be applied to an LTE (Long Term Evolution) system, so that the controlling node is an eNodeB, and the first non listening state is a DRX state.

Figure 5:
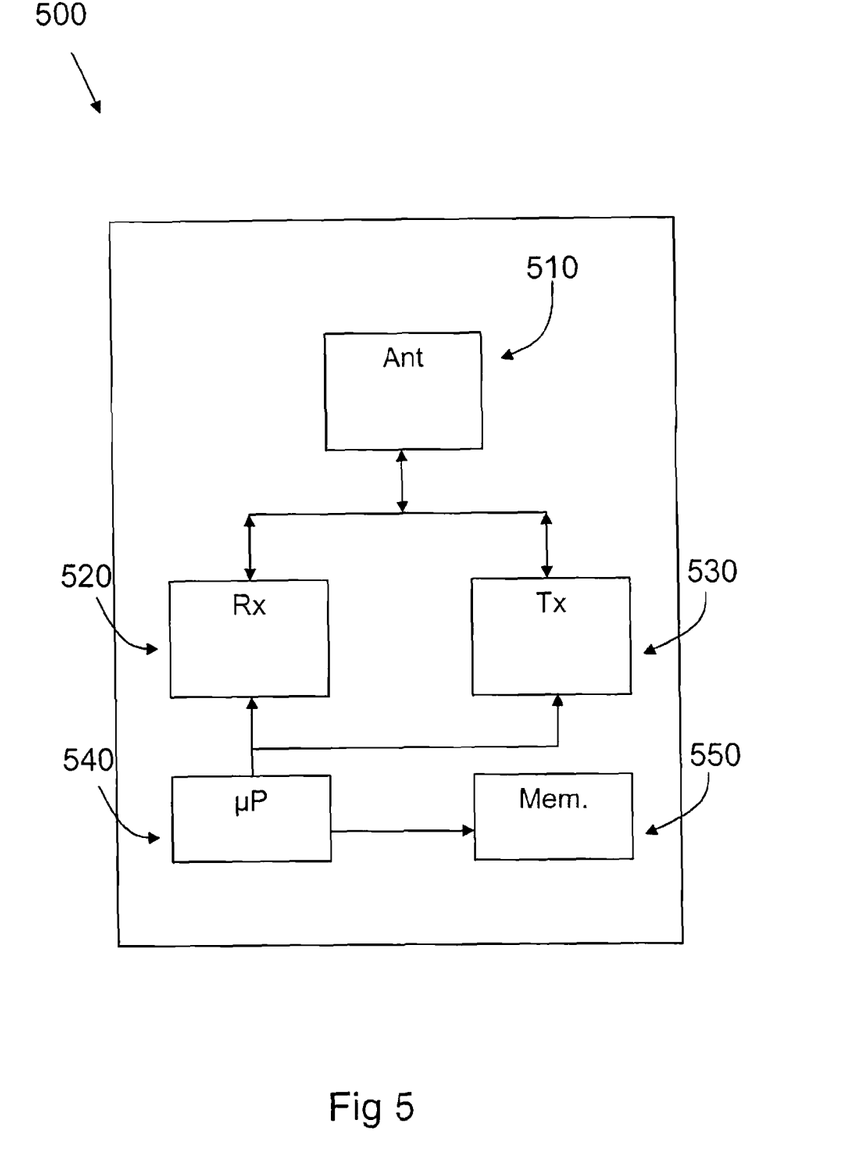
FIG. 5 shows a rough block diagram of a UE of the invention.

FIG. 5 shows a rough block diagram of a transceiver 500 of the invention, for use as a UE which basically functions as described above. As can be seen in FIG. 5, the UE 500 of the invention comprises an antenna 510 for communicating with the eNodeB, and also comprises a transmitter 530 and a receiver 520. In addition, the UE 500 also comprises control means such as for example a microprocessor 540, as well as comprising a memory 550.

The transceiver 500 basically comprises means for functioning according to the method described above, and thus comprises means such as the controller 540 and the memory 550 for assuming one of at least two different states, a first such state being an idle state, a DRX state, and a second such state being a listening state, an "on duration" state, each state being assumed for a certain amount of TTIs, Transmission Time Intervals. Suitably, the controller 540 controls the length of time, which it can retrieve from the memory 550.

The UE 500 of the invention also comprises means such as the antenna 510, the receiver 520 and the controller 540 for receiving at least a first and a second type of traffic from an eNodeB. In addition, the transceiver 500 may use the controller 540 and the memory 550 for assuming the idle (DRX) state at the end of an on duration period if the first type of traffic is received during the on duration period, and may use the same means 540, 550, for prolonging the current on duration period by a certain amount of time if the second type of traffic is received by the UE during the on duration period. Suitably, the controller 540 controls the length of time, which it can retrieve from the memory 550.

In a preferred embodiment of the transceiver 500, the first type of traffic is real time traffic, and the second type of traffic is non-real time traffic, so called Best Effort traffic.

In another embodiment, the transceiver 500 can also comprise means such as the controller 540 and the memory 550 for functioning as an "inactivity timer" which is specified as an amount of TTIs, or other transmission units such as, for example, sub-frames, and the transceiver can also use the means 540, 550 for prolonging the on duration state for a period of time which corresponds to the inactivity timer, if Best Effort traffic is received during an ongoing on duration period.

The transceiver 500 may also use the antenna 510, the receiver 520 and the controller 540 to receive a third type of traffic from its eNodeB, said third type of traffic explicitly ordering the transceiver to assume one of said two states (on duration/DRX) at the end of the current on duration period, the order also comprising the amount of TTIs that the state should be assumed for. The third type of traffic can be so called MAC messages.

Such a MAC message may comprise an order to the transceiver to assume the DRX state for a certain number of TTIs following the current on duration period, or to assume the on duration state for a certain number of TTIs following the current on duration period.

The invention is not limited to the examples of embodiments described above and shown in the drawings, but may be freely varied within the scope of the appended claims. For example, although the invention has mainly been described above with terms from systems of the LTE kind, the invention may be applied to other kinds of wireless cellular access systems.

It should also be pointed out that within the scope of the present invention, different types of bearers may be configured with different values for the intervals during which a UE assumes the on-duration period and the "inactivity timers", so that depending on which bearer that the data is received on, these periods will have different extensions in time.

What is claimed is:

1. A method for use in a cellular wireless access system that includes at least one controlling node that controls transmissions to and from user terminals (UEs) in a certain area of the system, wherein a UE can be in one of at least two different states, a first of the states being a non-listening state in which the UE does not listen for data from its controlling node, and a second of the states being a listening, on-duration state, each state being assumed for a certain amount of time, a time period during which the listening state is assumed being an on-duration period, in which the UE can receive at least a first and a second type of data from its controlling node, and wherein the method comprises:
 detecting, in the UE, if the second type of data has been received in a current on-duration period; and
 in response to the UE detecting that the second type of data has been received by the UE during the current on-duration period, the UE acting to prolong the current on-duration period by a certain amount of time.

2. The method of claim 1, further comprising the UE assuming the first state at the end of the current on-duration period if the first type of data is received by the UE during said current on-duration period.

3. The method of claim 1, wherein the second type of data is best-effort data, or signaling related to the transmission of best-effort data.

4. The method of claim 3, wherein the UE acting to prolong the current on-duration period comprises the UE extending the current on-duration period according to an inactivity timer, if best-effort data is received by the UE during the current on-duration period, wherein the inactivity timer specifies an amount of time.

5. The method of claim 1, further comprising the UE receiving control information from the controlling node, said control information explicitly ordering the UE to assume one of the at least two different states at the end of the current on-duration period, and specifying the amount of time that the state should be assumed for.

6. The method of claim 5, wherein said control information is included within a Medium Access Control (MAC) header, or Layer 2 Radio Resource Control (RRC) signaling.

7. The method of claim 5, wherein the UE receiving control information from the controlling node comprises the UE receiving a MAC header comprising an order to the UE to assume the non-listening state for a certain amount of time following the current on-duration period.

8. The method of claim 5, wherein the UE receiving control information from the controlling node comprises the UE receiving a MAC header comprising an order to the UE to assume the on-duration state for a certain amount of time following the current on-duration period.

9. The method of claim 1, wherein the controlling node is an eNodeB configured for operation in a Long Term Evolution (LTE) system, and wherein the non-listening state is a discontinuous reception (DRX) state.

10. A transceiver for use as a user terminal (UE) in a cellular wireless access system that includes at least one controlling node to control transmissions to and from the UE, said UE comprising:
 a transmitter configured for transmitting to the controlling node;
 a receiver configured for receiving at least a first and a second type of data from a controlling node; and a control circuit configured to:
  control the UE to assume one of at least two different states, a first of the states being a non-listening state in which the UE does not listen for data from the controlling node, and a second of the states being a listening, on-duration state, and wherein each state is assumed for a certain amount of time, a time period during which the on-duration state is assumed being an on-duration period; and
  detect whether the second type of data has been received in a current on-duration period and to prolong the current on-duration period by a certain amount of time, in response to detecting that the second type of data has been received during the current on-duration period.

11. The transceiver of claim 10, wherein the control circuit is configured to control the UE to assume the non-listening state at the end of the current on-duration period, if the first type of data is received during the current on-duration period.

12. The transceiver of claim 10, wherein the second type of data is best effort data, or signaling related to the transmission of best-effort data.

13. The transceiver of claim 12:
  wherein the control circuit is configured to prolong the current on-duration period by extending the current on-duration period according to an inactivity timer, if best-effort data is received by the UE during the current on-duration period; and
  wherein the inactivity timer specifies an amount of time.

14. The transceiver of claim 10:
  wherein the control circuit is further configured to receive, via the receiver, control information from the controlling node; and
  wherein the control information explicitly orders the transceiver to assume one of the at least two different states at the end of the current on-duration period, and specifies the amount of time that the state should be assumed for.

15. The transceiver of claim 14, wherein the control information is received in a Medium Access Control (MAC) header, or Layer 2 Radio Resource Control (RRC) signaling.

16. The transceiver of claim 14, wherein the control circuit is configured to receive and respond to control messages from the controlling node, including an order to the transceiver to assume the non-listening state for a certain amount of time following the current on-duration period.

17. The transceiver of claim 14, wherein the control circuit is configured to receive and respond to control messages from the controlling node, including an order to the transceiver to assume the on-duration state for a certain amount of time following the current on-duration period.

18. The transceiver of claim 14, wherein the UE is configured for operation in an Long Term Evolution (LTE) system, and wherein the controlling node is an eNodeB, and the first, non-listening state is the discontinuous reception (DRX) state.

* * * * *

UNITED STATES PATENT AND TRADEMARK OFFICE
CERTIFICATE OF CORRECTION

PATENT NO. : 8,532,009 B2  
APPLICATION NO. : 13/429508  
DATED : September 10, 2013  
INVENTOR(S) : Pelletier et al.

Page 1 of 1

It is certified that error appears in the above-identified patent and that said Letters Patent is hereby corrected as shown below:

On Title Page 2, Item (56), under "OTHER PUBLICATIONS", in Column 2, Line 2, delete "200-02-12," and insert -- 2007-02-12, --, therefor.

In the Specification

In Column 3, Line 43, delete "applied, and" and insert -- applied, --, therefor.

In Column 3, Line 44, delete "text, and" and insert -- text, --, therefor.

In Column 3, Line 45, delete "invention, and" and insert -- invention, --, therefor.

In the Claims

In Column 12, Line 25, in Claim 3, delete "an Long" and insert -- a Long --, therefor.

Signed and Sealed this  
Fifteenth Day of April, 2014

Michelle K. Lee  
*Deputy Director of the United States Patent and Trademark Office*